US011445715B2

(12) United States Patent
Reckhaus

(10) Patent No.: US 11,445,715 B2
(45) Date of Patent: Sep. 20, 2022

(54) LIVE TRAP FOR CATCHING LIVING INSECTS

(71) Applicant: RECKHAUS AG, Gais (CH)

(72) Inventor: Hans-Dietrich Reckhaus, Teufen (CH)

(73) Assignee: RECKHAUS AG, Gais (CH)

( * ) Notice: Subject to any disclaimer, the term of this patent is extended or adjusted under 35 U.S.C. 154(b) by 0 days.

(21) Appl. No.: 17/000,575

(22) Filed: Aug. 24, 2020

(65) Prior Publication Data

US 2020/0383309 A1 Dec. 10, 2020
US 2021/0352884 A9 Nov. 18, 2021

(30) Foreign Application Priority Data

May 13, 2020 (DE) .......................... 202020002111.3

(51) Int. Cl.
*A01M 1/10* (2006.01)
*A01M 1/02* (2006.01)

(52) U.S. Cl.
CPC .............. *A01M 1/106* (2013.01); *A01M 1/02* (2013.01); *A01M 2200/012* (2013.01)

(58) Field of Classification Search
CPC ................................ A01M 1/106; A01M 1/02
USPC ........................................................... 43/122
See application file for complete search history.

(56) References Cited

U.S. PATENT DOCUMENTS

| 1,682,575 | A | * | 8/1928 | Leon | A01M 1/106 43/107 |
| 1,772,989 | A | * | 8/1930 | Emley | A01M 1/02 43/107 |
| 1,783,631 | A | * | 12/1930 | Sladky | A01M 1/106 43/107 |
| 1,823,892 | A | * | 9/1931 | Galbraith | A01M 1/223 43/112 |

(Continued)

FOREIGN PATENT DOCUMENTS

| DE | 202014008949 | | 12/2014 | | |
| GB | 2143112 | A * | 2/1985 | .............. | A01M 1/04 |

(Continued)

OTHER PUBLICATIONS

Extended Search Report for European Patent Application No. 20189774.1, dated Sep. 14, 2020, 8 pages.

*Primary Examiner* — Peter M Poon
*Assistant Examiner* — Morgan T Jordan
(74) *Attorney, Agent, or Firm* — Sheridan Ross P.C.

(57) ABSTRACT

A trap for catching living insects, specifically fruit flies, is provided having a catch container, a base, and a funnel-shaped insert. The funnel shaped insert has a funnel wall, a plurality of slits in the funnel wall, and a funnel exit opening. The insects to be caught are able to slip through the funnel exit opening, but not through the slits. Furthermore, the trap includes an attractant container in the catch container and/or in the base having a liquid attractant and a wick. The insects are attracted by the scent of the liquid attractant evaporating from the attractant container and fly or crawl through the (Continued)

funnel exit opening into the catch container, where they become trapped. The user can then carry the trap outside, remove the funnel-shaped insert, and release the captured insects alive outside. In this way, the insects can be kept out of human living and working spaces without killing the insects.

16 Claims, 3 Drawing Sheets

(56) References Cited

U.S. PATENT DOCUMENTS

| | | | | |
|---|---|---|---|---|
| 1,865,713 | A * | 7/1932 | Taylor | A01M 1/106 43/107 |
| 1,968,954 | A * | 8/1934 | Metzger | A01M 1/02 43/107 |
| 1,971,367 | A * | 8/1934 | Brooke | A01M 1/106 43/107 |
| 2,046,430 | A * | 7/1936 | Rutherford | A01M 1/103 43/107 |
| 2,193,492 | A * | 3/1940 | Richardson | A01M 1/02 43/107 |
| 2,899,722 | A * | 8/1959 | Adams | A01M 1/2083 422/125 |
| 4,030,233 | A * | 6/1977 | Wunsche | A01M 1/02 43/121 |
| 4,121,372 | A * | 10/1978 | Landaus | A01M 1/106 43/122 |
| 4,476,647 | A * | 10/1984 | Hall, Jr. | A01M 1/02 43/122 |
| 4,706,410 | A * | 11/1987 | Briese | A01M 1/02 43/107 |
| 4,873,787 | A * | 10/1989 | Schneidmiller | A01M 1/02 43/122 |
| 5,170,583 | A | 12/1992 | Coaker et al. | |
| 5,452,540 | A | 9/1995 | Dowd et al. | |
| 7,412,797 | B1 * | 8/2008 | Hiscox | A01M 1/02 43/107 |
| 2004/0040198 | A1 * | 3/2004 | Harris | A01M 1/106 43/107 |
| 2004/0231229 | A1 * | 11/2004 | Lenker | A01M 1/02 43/107 |
| 2005/0072039 | A1 * | 4/2005 | Wong | A01M 1/103 43/121 |
| 2005/0155277 | A1 | 7/2005 | Bagnall et al. | |
| 2005/0235554 | A1 * | 10/2005 | Uhl | A01M 23/08 43/107 |
| 2006/0016120 | A1 * | 1/2006 | Masters | A01M 1/103 43/114 |
| 2006/0162235 | A1 | 7/2006 | Shih et al. | |
| 2009/0151228 | A1 * | 6/2009 | Schneidmiller | A01M 1/106 43/122 |
| 2013/0152452 | A1 * | 6/2013 | Lazzarini | A01M 1/106 43/114 |
| 2013/0298444 | A1 * | 11/2013 | Strube | A01M 1/04 43/113 |
| 2014/0259877 | A1 * | 9/2014 | Singleton | A01M 1/106 43/107 |
| 2014/0311015 | A1 * | 10/2014 | Oehlschlager | A01M 1/023 43/114 |
| 2015/0000182 | A1 * | 1/2015 | Gomez | A01M 1/2016 43/122 |
| 2016/0242403 | A1 * | 8/2016 | Gaugler | A01N 25/00 |
| 2017/0000101 | A1 * | 1/2017 | Gaugler | A01M 1/14 |
| 2017/0006850 | A1 * | 1/2017 | Doman | A01M 1/106 |
| 2018/0035657 | A1 * | 2/2018 | Ots | A01M 1/2016 |
| 2018/0042212 | A1 * | 2/2018 | McGavin | A01N 31/02 |
| 2019/0200596 | A1 | 7/2019 | Natale | |
| 2019/0216075 | A1 | 7/2019 | McGavin | |
| 2020/0000079 | A1 | 1/2020 | Liu | |
| 2020/0120915 | A1 * | 4/2020 | Ryan | A01M 1/023 |
| 2020/0214278 | A1 * | 7/2020 | Stoller | A01M 1/02 |
| 2020/0383309 | A1 * | 12/2020 | Reckhaus | A01M 1/106 |
| 2021/0352884 | A9 * | 11/2021 | Reckhaus | A01M 1/02 |

FOREIGN PATENT DOCUMENTS

| | | | |
|---|---|---|---|
| KR | 20160048423 A | * | 5/2016 |
| KR | 20170135154 A | * | 12/2017 |

* cited by examiner

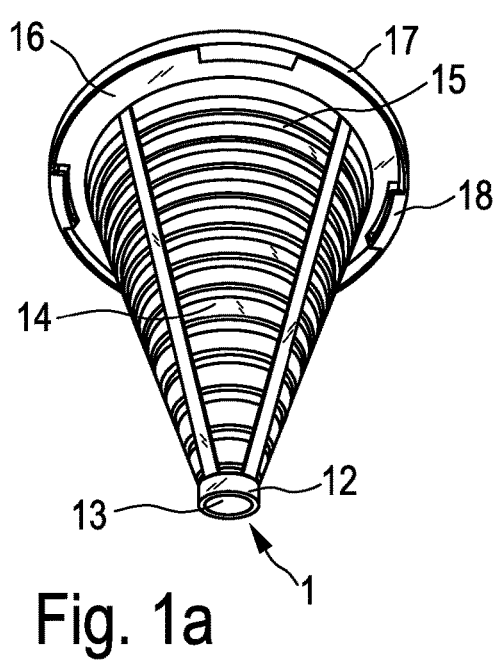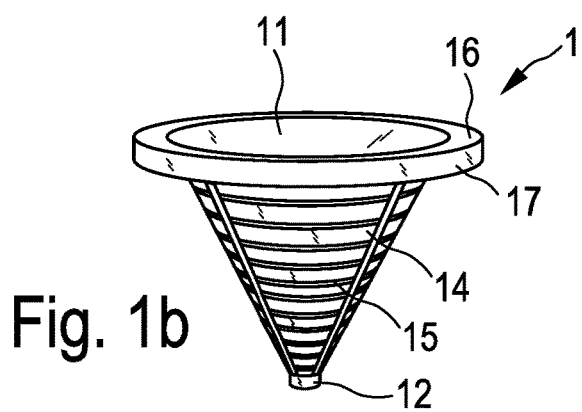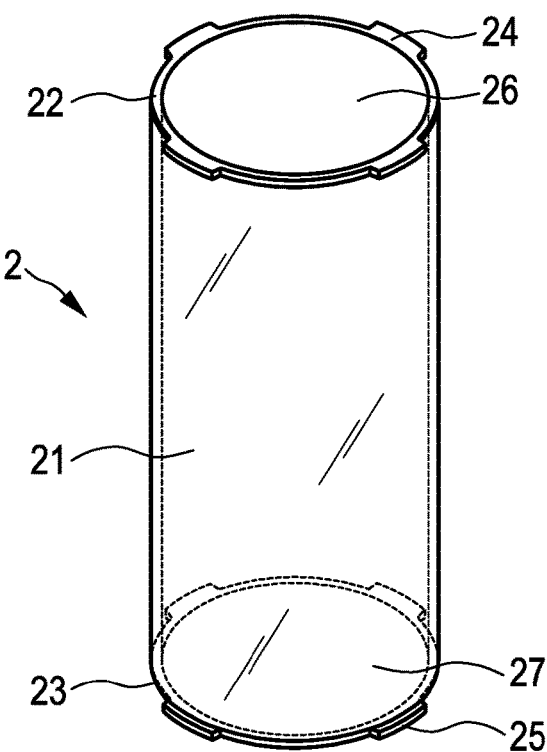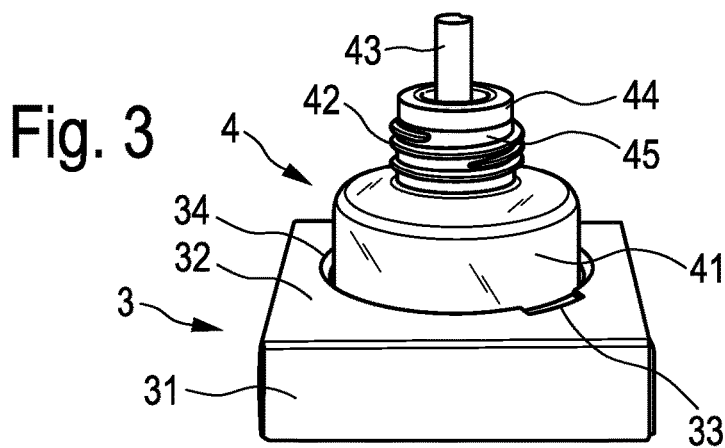

LIVE TRAP FOR CATCHING LIVING INSECTS

CROSS-REFERENCE TO RELATED APPLICATIONS

This application claims the benefit of German Patent Application No. DE 20 2020 002 111.3 filed May 13, 2020, the entire contents of which is hereby incorporated by reference and therefore part of the present application.

FIELD OF THE INVENTION

The present invention relates to a live trap for catching living insects, particularly fruit flies.

BACKGROUND

Flying insects, such as fruit flies, may be considered a nuisance and traps may be used to catch such insects. Traps can also be used for catching other insects alive, in particular flying insects of a similar size as fruit flies, for example food pantry moths.

Fruit flies (Drosophilidae) are particularly attracted to rotting fruit and fermenting beverage residue. Their presence is therefore a problem in many households, particularly in rooms where food is stored, such that there is a need for means to combat them.

SUMMARY

For this reason, a multitude of fruit fly traps are available in which the fruit flies are for the most part, however, killed. In such traps, the fruit flies are thus attracted for example by pieces of fruit and then stick to a surface coated with glue or adhesive on which they perish or they are attracted by a vinegar bath in which they then drown.

For ethical and environmental reasons, on the other hand, there is interest in generally keeping fruit flies and insects out of human living and working spaces yet without killing them at the same time. This interest stems both from a general respect for other living creatures, even the tiniest of animals, as well as from the realization that insects are highly beneficial to ecosystems and thus also to society, for example by pollinating edible and fodder crops.

There is thus in particular a need for so-called live insect traps; i.e. traps in which the captured insects are not killed but instead can be carried outside in the trap and released there.

The present invention is based on the task of providing a reliable live trap for insects, particularly fruit flies, which has high attractiveness to the insects to be caught and is at the same time easy to use and clean.

The invention provides for a live trap for catching living insects, particularly fruit flies, which comprises a catch container, a base and a funnel-shaped insert.

The funnel-shaped insert has a funnel entry opening, a funnel tip disposed opposite the funnel entry opening with respect to a longitudinal axis of the funnel-shaped insert, a funnel wall with a plurality of slits which connects the funnel entry opening to the funnel tip and tapers from the funnel entry opening to the funnel tip, and a funnel exit opening arranged on the funnel tip.

The funnel exit opening is thereby preferably large enough that the insects to be caught are able to slip through it and the slits in the funnel wall are preferably so narrow that the insects to be caught cannot slip through them.

The funnel-shaped insert is inserted into an, in the operational position, upward-facing upper opening of the catch container such that the funnel entry opening points upward and the funnel tip downward when in the operational position.

The catch container further exhibits an outer peripheral wall. In the operational position, the catch container stands on or in the base.

The live trap according to the invention further comprises an attractant container which is at least partly arranged in the catch container and/or at least partly in the base and has a liquid attractant and a wick.

Apple cider vinegar is thereby particularly suitable as a liquid attractant. It provides a particularly strong attractant to fruit flies, one which significantly exceeds the attracting effect of pieces of fruit, for example. In addition, apple cider vinegar is a natural active substance. Furthermore, using such a liquid attractant allows for easier cleaning of the fruit fly trap than inserting for example pieces of fruit which dry out and stick to the walls of the fruit fly trap.

Instead of providing for example an open bowl filled with liquid attractant from which the liquid attractant can evaporate relatively quickly and uncontrollably, the invention uses an attractant container provided with a wick. The wick continually extracts a specific amount of liquid attractant from the attractant container per unit of time by capillary action, allowing it to evaporate.

Doing so ensures a consistent dispensing of the liquid attractant from the attractant container into the fruit fly trap as well as into the surrounding air over a longer period of time which is neither too slow nor too quick. For example, with a supply of 40 ml liquid attractant in the attractant container, the fruit fly trap remains effective for approximately 6 to 8 weeks.

In addition, once the liquid attractant is gone, the attractant container as a whole can be replaced without contaminating the catch container.

When the inventive fruit fly trap is in use, the liquid attractant evaporating from the attractant container exudes a scent which wafts upward through the slits in the funnel wall and through the funnel entry opening and attracts the fruit flies. They then fly or crawl into the funnel-shaped insert, slip through the funnel exit opening at its lower end into the catch container and continue to be attracted by the scent of the liquid attractant there.

If the fruit flies even want to escape from the trap at all, they orientate themselves upward and are attracted by the pattern of light formed by the slits in the funnel wall. However, since they cannot escape through the slits, they collect in the upward tapering space between the funnel wall and the outer peripheral wall of the catch container. The probability of individual fruit flies escaping upward through the funnel exit opening again is relatively low.

After some time, the user can then carry the fruit fly trap outside, remove the funnel-shaped insert, and release the captured fruit flies alive outside.

Doing so solves the task of the invention of providing a reliable live trap for insects which is easy to use and clean and has a good attracting effect.

In one preferential implementation of the invention, the outer peripheral wall of the catch container further comprises a lower opening which points downward in the operational position.

The lower opening in the catch container enables easily placing the catch container completely or partially over the attractant container, or removing the catch container from the attractant container without the user needing to touch the attractant container in the process and thereby come into contact with the potentially pungent or even noxious liquid attractant. This also allows the catch container with the fruit flies captured therein to be removed from the attractant container and brought outdoors in order to release the captured fruit flies without needing to also take the attractant container along with it. This avoids the risk of liquid attractant spilling or the entire attractant container falling out when carrying out the fruit fly trap or when releasing the fruit flies.

In one preferential variant of this implementation, part of the attractant container is arranged in the catch container and part in the base.

The lower downward-facing opening in the catch container thereby allows the attractant container to extend downward out of the catch container and only be partly arranged in the catch container yet also partly in the base on which the catch container is arranged.

Furthermore, this arrangement of the attractant container results in a particularly low attractant container center of gravity and thus provides a secure stability of the fruit fly trap as a whole.

Lastly resulting therefrom is a particularly visually attractive fruit fly trap since the attractant container itself is partially concealed by the base and thus only partly visible from the outside, particularly when the base is made from a non-transparent material.

In a further preferential variant of the latter implementation or variant thereof, the base comprises a depression and a raised floor in said depression, wherein the attractant container sits on the bottom of the depression and the catch container sits on the raised floor.

This thus has the effect of the bottom of the attractant container being lower than the bottom of the catch container. This thereby enables in particular realizing the arrangement as per the latter variant in which part of the attractant container is arranged in the catch container and part in the base. If the distance between the bottom of the depression and the raised floor in the base is greater than the height of the attractant container, the entire attractant container can then be arranged in the base below the catch container and thus not visible at all from the outside.

In a further preferential implementation of the invention, the outer peripheral wall of the catch container is substantially cylindrical or conical, and a longitudinal axis of the catch container is arranged substantially vertically in the operational position.

This thereby results in a particularly simple and visually attractive design to the fruit fly trap. Moreover, due to its cylindrical or conical shape, the catch container can be produced relatively easily by plastic injection molding. The substantially vertically arranged longitudinal axis of the catch container ensures that the evaporating liquid attractant can directly escape upward into the surrounding air through the funnel-shaped insert.

In a further preferential implementation of the invention, the surface area of a cross-section of the funnel entry opening in the operational position amounts to substantially at least 50%, preferably at least 70%, further preferably at least 80% of the surface area of the largest horizontal cross section of the inner surface of the catch container's outer peripheral wall within the vertical extension (i.e., height extension) of the catch container.

The funnel entry opening is thus relatively large compared to the cross section of the catch container, whereby both the amount of liquid attractant escaping through the funnel-shaped insert as well as the number of fruit flies entering the fruit fly trap are increased.

In a further preferential implementation of the invention, the funnel-shaped insert is connected to the catch container, in particular at an edge of the catch container's outer peripheral surface pointing upward in the operational position, by means of a plug connection, latching connection, screw connection or bayonet connection.

Such a non-positive or positive connection between the funnel-shaped insert and the catch container results in increased stability for the entire fruit fly trap as a whole. In particular the funnel-shaped insert is prevented from inadvertently falling out of the catch container if the latter for example tips over and resulting in the captured fruit flies thus being able to escape again into the living or working space.

Particularly in the implementation in which the catch container also comprises a lower opening, there is no need to ever disengage the connection between the funnel-shaped insert and the catch container under normal conditions since both the releasing of the captured fruit flies as well as the replacing of the attractant container can be done from below through the lower opening.

In a further preferential implementation of the invention, the base is connected to the catch container, in particular at an edge of the catch container's outer peripheral surface pointing downward in the operational position, by means of a plug connection, latching connection, screw connection or bayonet connection.

Such a non-positive or positive connection of also the base to the catch container results in increased stability for the entire fruit fly trap as a whole. Above all, however, the catch container can thereby be easily separated from the base in order to release the captured fruit flies or replace the attractant container.

In one preferential variant common to both of the two latter implementations, the connection of the funnel-shaped insert to the catch container and the connection of the base to the catch container are of identical design.

This facilitates the user's handling of the fruit fly trap since the user can use the same motion when closing and opening the two connections. It furthermore facilitates the production of the components involved (funnel-shaped insert, catch container and base) as the corresponding connecting apparatus such as threads or latching projections are only developed once and can then be replicated.

In a further preferential implementation of the invention, the catch container is of discretely rotationally symmetrical design with respect to a horizontal axis in the operational position; i.e. it turns into itself when rotating about this axis. Preferably, this axis runs through a center plane of the catch container between its upper edge and its lower edge. In particular, the catch container can thereby have two identical; i.e. congruently designed, connections to the funnel-shaped insert or to the base respectively in accordance with the latter variant as described.

This also this facilitates the user's handling since the user does not have to be concerned with the orientation of the catch container prior to connecting the catch container to the funnel-shaped insert or to the base respectively but instead, due to its rotational symmetry, the container can thereby be used in two orientations rotated 180 degrees from one another.

In a further preferential implementation of the invention, the catch container, the funnel-shaped insert and the base are not all made of the same material. In particular, the catch container and the funnel-shaped insert can be made of plastic and the base made of cardboard.

Using at least partly different materials for the catch container, the funnel-shaped insert and the base allows for selectively varying the visual appearance of the fruit fly trap. Preferably, by producing the base from cardboard, the base can be designed to be partially opaque so as to partly conceal the attractant container whereas the catch container and the funnel-shaped insert can be made of transparent plastic so that the quantity of captured fruit flies can be monitored from the outside.

In a further preferential implementation of the invention, the base is produced from a single cut and folded sheet of cardboard and has the shape of a box.

This constitutes a particularly simple and economical approach to producing the base. Any opening in the base for the attractant container and/or for the catch container can thereby be directly provided when cutting the cardboard sheet by cutting or stamping out a corresponding hole. Likewise, any raised floor on which the catch container may be positioned can be provided by the corresponding cutting and folding of the cardboard sheet. Even a simple connection between the catch container and the base, such as in particular a plug or bayonet connection, can be realized with a base produced in this way.

BRIEF DESCRIPTION OF THE DRAWINGS

Further advantages, features and possible applications of the present invention will become apparent from the following description in conjunction with the figures. Thereby shown are:

FIG. 1a a funnel-shaped insert of a fruit fly trap according to the invention in a perspective view at a diagonal angle from below;

FIG. 1b a funnel-shaped insert of the inventive fruit fly trap in a perspective view at a diagonal angle from above;

FIG. 2 a catch container of the inventive fruit fly trap in a perspective view at a diagonal angle from above;

FIG. 3 a base and an attractant container of the inventive fruit fly trap in a perspective view at a diagonal angle from above;

DETAILED DESCRIPTION

FIGS. 1a, 1b, 2 and 3 show the components of the fruit fly trap according to the invention, namely the funnel-shaped insert 1, the catch container 2, the base 3 and the attractant container 4, wherein FIGS. 1b, 2 and 3 together constitute an exploded view of the fruit fly trap.

Figure 4:
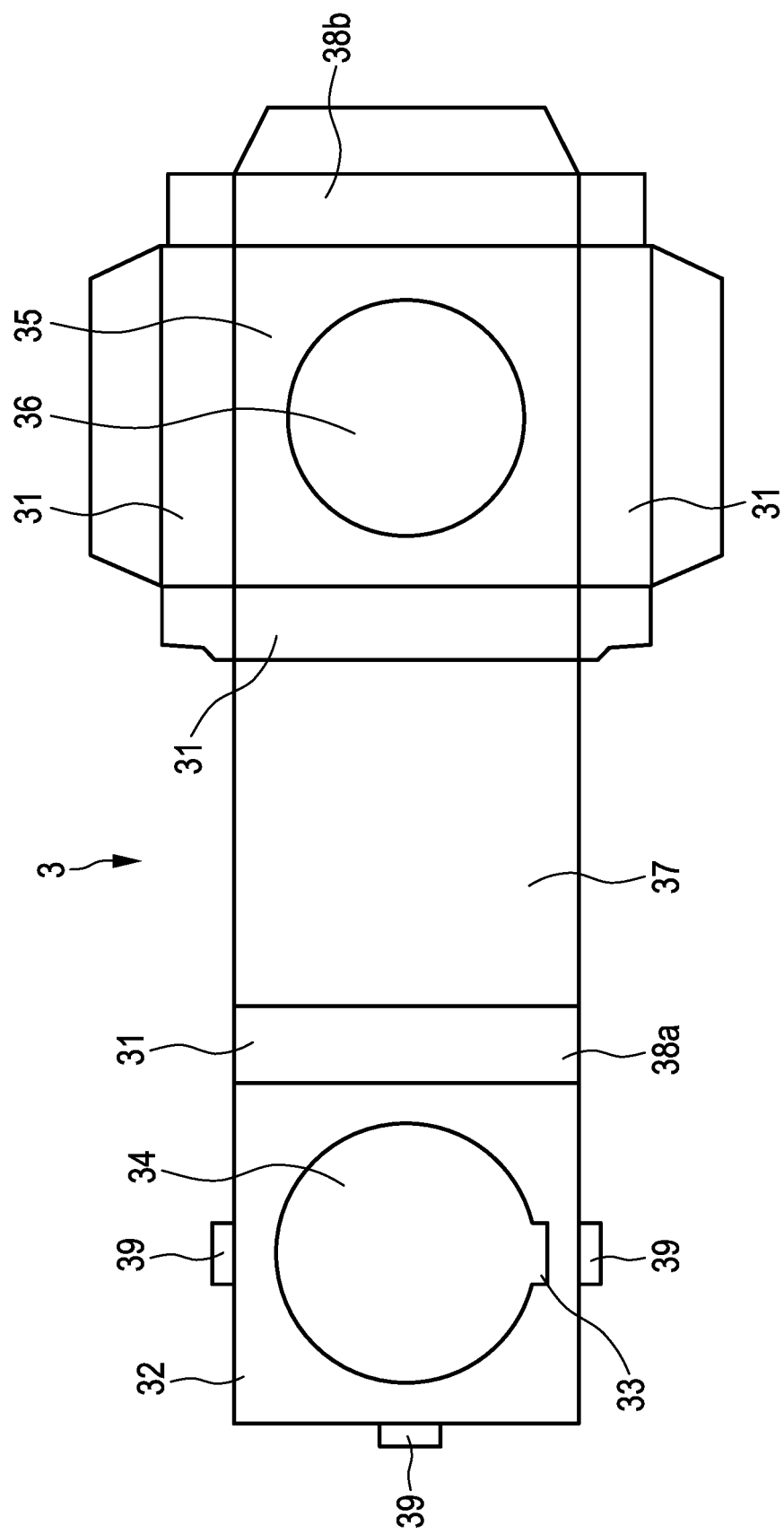
FIG. 4 the base of the inventive fruit fly trap in the unfolded state.

All of the figures except for FIG. 4 are depicted in the fruit fly trap's operational position. Designations in the following such as "above," "below," "vertical," "horizontal," etc., are also in reference to this operational position.

The funnel-shaped insert 1 (FIGS. 1a and 1b) exhibits a conical funnel wall 14 surrounding a funnel entry opening 11 at its top and tapering toward the funnel tip 12 at its bottom. A vertically aligned funnel exit opening 13, which is just large enough to enable a fruit fly to slip through, is arranged in the funnel tip 12.

An annular, horizontally arranged funnel flange 16 adjoins the funnel entry opening 11 radially outwardly by its inner edge. A downward-aligned skirt 17 of small vertical extension (i.e., a small height extension) is arranged at the outer edge of the funnel flange 16.

A plurality of latch receivers 18 (four in the present implementation) are distributed around the circumference of the funnel flange 16, these to be described in greater detail further below.

The funnel wall 14 is interrupted by a plurality of slits 15. Each slit 15 is of such narrow width that a fruit fly cannot slip through it. The slits 15 are arranged horizontally in the conical funnel wall 14 and thus each in the shape of a circular arc.

In particular, the slits 15 are arranged in the funnel wall 14 in concentric horizontal rings. Each ring has four individual slits 15 in the circumferential direction which are separated from one another by vertical webs, whereby the webs increase the stability of the funnel-shaped insert 1.

The funnel-shaped insert 1 in this implementation is made from a transparent plastic, preferably from PET and further preferably from PET recyclate. Of course, different materials other than plastic can also be used for the funnel-shaped insert 1 such as glass, metal, ceramic or cardboard.

The catch container 2 (FIG. 2) has a cylindrical, vertically aligned outer peripheral wall 21 with an upper edge 22 and a lower edge 23. The upper and lower face sides of the outer peripheral wall 21 are open and form an upper opening 26, or respectively lower opening 27, of the catch container 2.

Evenly distributed over the circumference of the upper edge 22 and the lower edge 23 of the catch container 2, are a plurality of upper latching projections 22, or lower latching projections 25 respectively (in the present implementation, four), that project radially outward from the upper edge 22 or lower edge 23 respectively.

The upper latching projections 24 form the counterpart to the latch receivers 18 of the funnel-shaped insert 1 and can be connected thereto via a type of bayonet coupling. To that end, the funnel-shaped insert 1 is set onto the upper opening 26 of the catch container 2, whereby the latch receivers 18 and the latching projections 24 initially have different angular positions. The funnel flange 16 and the skirt 17 thereby enclose the upper edge 22 of the catch container 2 from above or radially outwardly respectively.

Each latch receiver 18 is configured as a slit-shaped opening having an open end and a closed end in the circumferential direction, forming a stop, and which tapers slightly in the circumferential direction from the open to the closed end.

If the funnel-shaped projection 1 is now rotated about its longitudinal axis in a specific direction, preferably clockwise, wherein it is guided by the funnel flange 16 and the skirt 17 on the upper edge 22 of the catch container 2, each upper latching projection 24 then sets into a specific latch receiver 18 until it strikes against the stop in the circumferential direction and is concurrently wedged in the latch receiver 18 by the tapering slit. A simple bayonet coupling is thereby realized between the funnel-shaped insert 1 and the catch container 2.

The upper edge 22 of catch container 2 with the upper latching projections 24 and the lower edge 23 of catch container 2 with the lower latching projections 25 are of identical design. The catch container 2 can thus even be used when rotated 180 degrees about a horizontal axis running through its center plane so that the lower latching projections 25 then latch into the latch receivers 18 of funnel-shaped insert 1.

The catch container 2 in this implementation is made from the same material as the funnel-shaped insert 1, wherein the alternatively mentioned materials for the funnel-shaped insert 1 can of course also be a possibility.

The base 3 (FIGS. 3 and 4) has the basic shape of a low cuboid with a square surface area, whereby the lateral length of the base in this implementation is approximately three and a half times as large as the height of the cuboid. The base 3 thus comprises four outer lateral surfaces 31, one upper lateral surface 32 and one lower lateral surface 37. The base 3 is produced from a single cut and stamped sheet of cardboard which is folded, glued and stuck together in order to obtain its three-dimensional form (see the description on FIG. 4 below).

The upper lateral surface 32 comprises a circular upper opening 34 which has a somewhat larger diameter than the lower edge 23 of the catch container 2. The depression in the base 3 unblocked by the upper opening 34 is continuously open to its lower lateral surface 37. Furthermore, the upper lateral surface 32 comprises a radially outward aligned latch opening 33 which has the same shape and is somewhat larger than the lower latching projections 25 of the catch container 2.

The base 3 comprises a raised floor 35 in the depression between the upper lateral surface 32 and the lower lateral surface 37 which runs parallel to the upper lateral surface 32 and the lower lateral surface 37 and is arranged at a short distance below upper lateral surface 32. The raised floor 35 has a circular opening 36 which is concentric to the upper opening 34 of the base 3 but has a somewhat smaller diameter than the lower edge 23 of the catch container 2.

The base 3 is depicted again in FIG. 4 in an unfolded position as a flat cardboard sheet, wherein the interior of the base is visible in FIG. 4.

Figure 5:
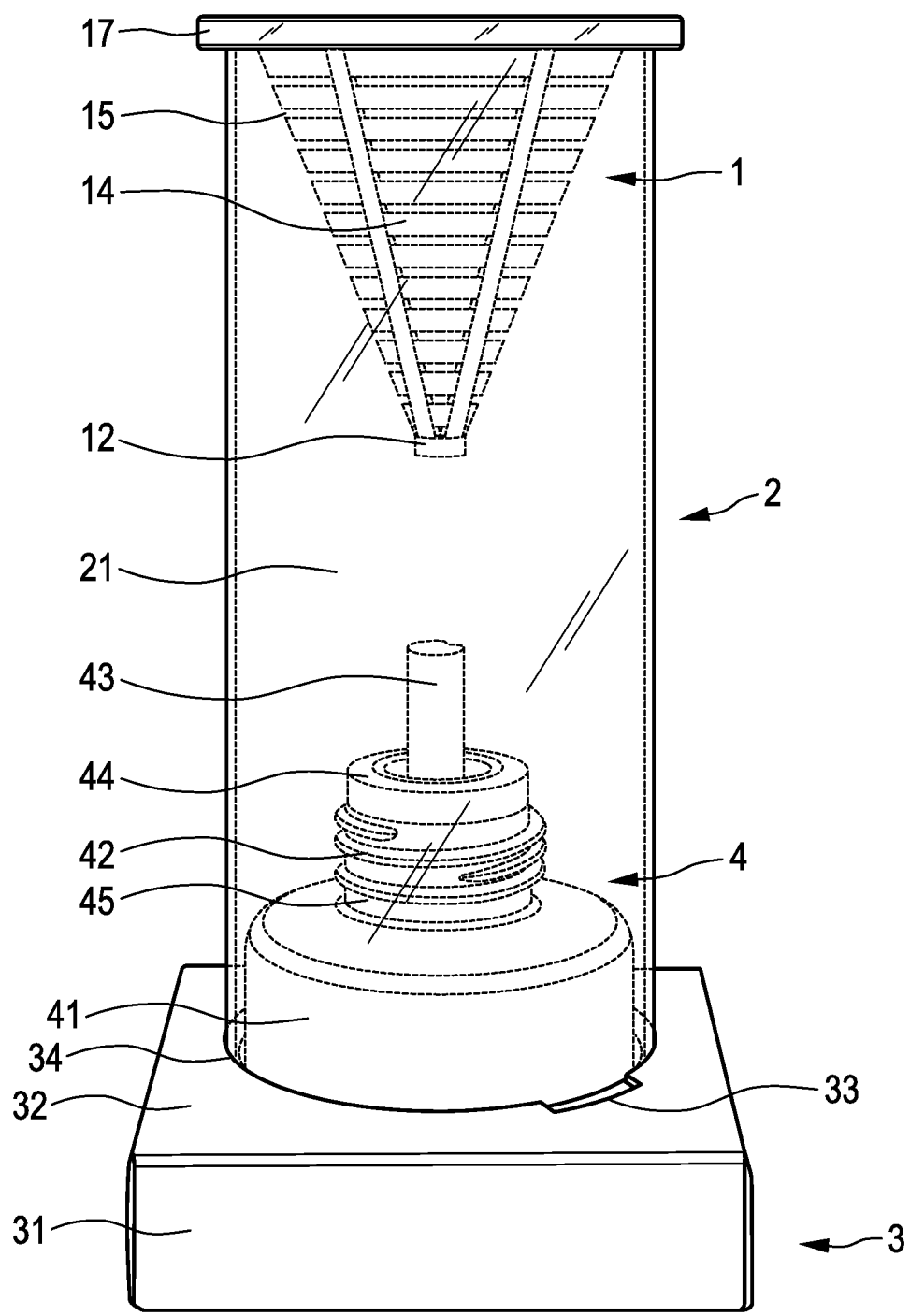
FIG. 5 a fully assembled fruit fly trap according to the invention in a partly perspective side view.

In FIG. 4, the latch opening 33 points toward the center of a longitudinal side of the upper lateral surface 32 and not, as in FIGS. 3 and 5, toward a corner of the upper lateral surface 32. The circumferential position of the latch opening 33 on the edge of the upper opening 34 in the upper lateral surface 32 is, however, obviously of no relevance to the connection between the catch container 2 and the base 3 and is therefore freely selectable.

The produced form as depicted in FIG. 4; i.e. cut and stamped cardboard sheet, is now inwardly "rolled up" around an imaginary axis along the horizontal direction in FIG. 4. The cardboard sheet is thereby folded 90 degrees inward on all the marked vertical lines representing the transitions from one respective wall section of the base 3 to a neighboring wall section.

The cardboard sheet is initially rolled up until the adhesive surfaces 38a and 38b lie on top of each other (adhesive surface 38b is on the reverse side of the cardboard sheet opposite the side visible in FIG. 4). The adhesive surfaces 38a and 38b are glued together in this state.

The cardboard sheet is now rolled up further in the cited direction so that the upper lateral surface 32 covers the raised floor 35 with a slight space in between.

Lastly (or even prior to rolling up), the two outer lateral surfaces 31 bordering the raised floor 35 above and below are likewise folded by 90 degrees. Ultimately, all the fixing tabs 39 are inserted into the (not shown) slits provided for the purpose, thus fixing the base 3 in its box shape.

This results in the initially described base 3 in the form of a box, more precisely in the form of a low cuboid with a square surface area, having the described openings.

For usage of the fruit fly trap, the attractant container 4 is placed into the depression in the base 3 on its lower lateral surface 37. The catch container 2, connected to the funnel-shaped insert 1 as described above, is then placed on the base 3 and the lower latching projections 25 of the catch container 2 are successively inserted through the latch opening 33 into the upper lateral surface 32 of the base 3 by carefully turning the catch container 2 until the catch container 2 sits on the raised floor 35. The catch container 2 is then further rotated a certain angle so that no lower latching projection 25 is aligned with the latch opening 33 of the base 3. The catch container 2 is thereby fixed between the upper lateral surface 32 and the raised floor 35 of the base 3 and thus secured against being pulled out of the base 3.

The attractant container 4 has a substantially cylindrical attractant reservoir 41 filled with a liquid attractant such as apple cider vinegar adjoined by an upward tapering neck 45 having an external thread 42. A wick 43 sealed off from the neck 45 by seal 44 extends upward through the neck 45 from the attractant reservoir 41 and protrudes upward over the neck 45. The wick 43 consists predominantly of natural fibers. By means of the wick 43, a consistent quantity of liquid attractant is conveyed from the attractant reservoir 41 and evaporated into the surroundings. A (not depicted) cap can be screwed onto the external thread 42 of the neck 45 over the wick 43 in order to seal the wick 43 against the environment and thus prevent evaporation of liquid attractant when the fruit fly trap is not in use.

The diameter of the attractant reservoir 41, and thus the largest diameter of the attractant container 4, is somewhat smaller than the inner diameter of the outer peripheral wall 21 of the catch container 2 so that the catch container 2 can be loosely placed on the attractant container 4. The gap between the outer side of the attractant container 4 and the inner side of the outer peripheral wall 21 of the catch container 2 is thereby so small that fruit flies are not able to slip through said gap.

The attractant container 4 can also be made from PET recyclate or from a plastic having a high PET recyclate content.

After realizing the above-cited steps, the fruit fly trap is fully assembled, whereby part of the attractant container 4 is arranged in the depression of the base 3 and part in the catch container 2.

The fruit flies are then attracted by the liquid attractant evaporated into the surrounding air, crawl through the funnel entry opening 11 into the funnel-shaped insert 1, and slip through the funnel exit opening 13 at the funnel tip 12 into the catch container 2 where they become trapped.

Once enough fruit flies are caught, the user can either carry the entire fruit fly trap with the base 3 and the attractant container 4 outside, remove the catch container 2 from the base 3—or the funnel-shaped insert 1 from the catch container 2—in reverse order as described above, and release the fruit flies.

The user can, however, also first remove the catch container 2 with the funnel-shaped insert 1 from the base 3 and then take the catch container 2 outside. Since fruit flies are generally upward-oriented, it is unlikely they will escape again in the short time in which the catch container 2 is open at the bottom.

Depending on the severity of the fruit fly infestation, the captured fruit flies can be released for example on a daily basis.

FIG. 5 shows an inventive fruit fly trap again in its fully assembled and ready-to-use state.

LIST OF REFERENCE NUMERALS

| | | | |
|---|---|---|---|
| 1 | funnel-shaped insert | 3 | base |
| 11 | funnel entry opening | 31 | outer lateral surface |
| 12 | funnel tip | 32 | upper lateral surface |
| 13 | funnel exit opening | 33 | latch opening |
| 14 | funnel wall | 34 | upper opening |
| 15 | slit | 35 | raised floor |
| 16 | funnel flange | 36 | opening in raised floor |
| 17 | skirt | 37 | lower lateral surface |
| 18 | latch receiver | 38a,b | adhesive surfaces |
| 2 | catch container | 39 | fixing tab |
| 21 | outer peripheral wall | 4 | attractant container |
| 22 | upper edge | 41 | attractant reservoir |
| 23 | lower edge | 42 | external screw |
| 24 | upper latching projection | 43 | wick |
| 25 | lower latching projection | 44 | seal |
| 26 | upper opening | 45 | neck |
| 27 | lower opening | | |

What is claimed is:

1. A live trap for catching living insects, comprising:
a catch container having an outer peripheral wall;
a base; and
a funnel-shaped insert comprising:
  a funnel entry opening;
  a funnel tip disposed opposite the funnel entry opening with respect to a longitudinal axis of the funnel-shaped insert;
  a funnel wall with a plurality of slits, the funnel wall connecting the funnel entry opening to the funnel tip and tapering from the funnel entry opening to the funnel tip; and
  a funnel exit opening arranged on the funnel tip,
wherein the funnel-shaped insert is inserted into an upward-facing upper opening of the catch container in an operational position such that the funnel entry opening points upward and the funnel tip points downward when in the operational position,
wherein the catch container stands on or in the base in the operational position,
wherein the live trap comprises an attractant container that is at least partly arranged in the catch container and/or at least partly in the base, and the attractant container has a liquid attractant and a wick,
wherein the base comprises a depression and a raised floor in said depression, and
wherein the attractant container sits on a bottom of the depression and the catch container sits on the raised floor.

2. The live trap according to claim 1, wherein the outer peripheral wall of the catch container further comprises a lower opening that points downward in the operational position.

3. The live trap according to claim 1, wherein part of the attractant container is arranged in the catch container and partly in the base.

4. The live trap according to claim 1, wherein the outer peripheral wall of the catch container is substantially cylindrical or conical and a longitudinal axis of the catch container is arranged substantially vertically in the operational position.

5. The live trap according to claim 1, wherein in the operational position a surface area of a cross-section of the funnel entry opening amounts to at least 50% of a surface area of a largest horizontal cross section of an inner surface of the outer peripheral wall of the catch container within a vertical extension of the catch container.

6. The live trap according to claim 1, wherein the funnel-shaped insert is connected to the catch container by means of a plug connection, a latching connection, a screw connection, or a bayonet connection.

7. The live trap according to claim 6, wherein the base is connected to the catch container by means of a plug connection, a latching connection, a screw connection, or a bayonet connection.

8. The live trap according to claim 7, wherein the connection of the funnel-shaped insert to the catch container and the connection of the base to the catch container are of identical design.

9. The live trap according to claim 1, wherein the base is connected to the catch container at an edge of the outer peripheral wall of the catch container, wherein the edge is pointed downward in the operational position.

10. The live trap according to claim 1, wherein the funnel-shaped insert is connected to the catch container at an edge of the outer peripheral wall of the catch container, wherein the edge is pointed upward in the operational position.

11. The live trap according to claim 1, wherein the catch container is discretely rotationally symmetrical with respect to an axis that is oriented horizontally in the operational position.

12. The live trap according to claim 1, wherein the catch container, the funnel-shaped insert, and the base are not all made of the same material.

13. The live trap according to claim 12, wherein the catch container and the funnel-shaped insert are made of plastic and the base is made of cardboard.

14. The live trap according to claim 1, wherein the base is produced from a single cut and folded sheet of cardboard and has the shape of a box.

15. The live trap according to claim 1, wherein in the operational position a surface area of a cross-section of the funnel entry opening amounts to at least 80% of a surface area of a largest horizontal cross section of an inner surface of the outer peripheral wall of the catch container within a vertical extension of the catch container.

16. The live trap according to claim 1, wherein the living insects to be caught are fruit flies.

* * * * *